(12) United States Patent
Huang

(10) Patent No.: US 10,926,359 B2
(45) Date of Patent: Feb. 23, 2021

(54) CARBIDE SAW BLADE AND WELDING METHOD THEREOF

(71) Applicant: ZHONGSHAN KINGWAVE SAW BLADE MANUFACTURING LTD, Guangdong (CN)

(72) Inventor: HaoNan Huang, Guangdong (CN)

(73) Assignee: ZHONGSHAN KINGWAVE SAW BLADE MANUFACTURING LTD, Zhong Shan (CN)

( * ) Notice: Subject to any disclaimer, the term of this patent is extended or adjusted under 35 U.S.C. 154(b) by 1 day.

(21) Appl. No.: 16/191,586

(22) Filed: Nov. 15, 2018

(65) Prior Publication Data

US 2019/0152000 A1    May 23, 2019

(30) Foreign Application Priority Data

Nov. 17, 2017  (CN) .......................... 201711141942.1

(51) Int. Cl.
| | | |
|---|---|---|
| *B23D 65/00* | (2006.01) | |
| *B23K 31/02* | (2006.01) | |
| *B23B 27/18* | (2006.01) | |
| *B23D 61/14* | (2006.01) | |
| *B23D 61/04* | (2006.01) | |
| *B23K 101/20* | (2006.01) | |

(52) U.S. Cl.
CPC ............ *B23K 31/025* (2013.01); *B23B 27/18* (2013.01); *B23D 61/04* (2013.01); *B23D 61/14* (2013.01); *B23D 65/00* (2013.01); *B23K 2101/20* (2018.08)

(58) Field of Classification Search
None
See application file for complete search history.

(56) References Cited

U.S. PATENT DOCUMENTS

| | | | | |
|---|---|---|---|---|
| 2,686,665 | A * | 8/1954 | Tauber ................... | C21D 9/663 266/255 |
| 3,099,738 | A * | 7/1963 | Sadowski ............ | B23K 31/025 219/85.14 |
| 3,231,433 | A * | 1/1966 | Campbell ................ | C21D 9/24 148/211 |
| RE26,676 | E * | 9/1969 | Anderson et al. ..... | B23D 65/00 76/112 |
| 3,800,633 | A * | 4/1974 | Funakubo .............. | B23D 61/00 76/112 |

(Continued)

*Primary Examiner* — Kenneth E Peterson
(74) *Attorney, Agent, or Firm* — Hauptman Ham, LLP

(57) ABSTRACT

A carbide saw blade and the welding method of the carbide saw blade includes: S1, heating the carbide tool bit, the saw blade base (the saw blade base's tooth seat part), the welding wire and the welding flux that well-placed; S2, at temperature 760° C.-840° C., spreading the melted welding wire to the gap between the carbide tool bit and the saw blade base by using the wetting action of the welding flux; S3, cooling to obtain a preliminary welding body, when the temperature of the preliminary welding body is lower than 350° C., the preliminary welding body will be processed to first tempering; S4, within 1-3 hours after first tempering, second tempering the preliminary welding body to obtain carbide saw blade; second tempering process is performed in a sealed container, and in this container the temperature of each spatial location is consistent.

8 Claims, 4 Drawing Sheets

(56) References Cited

U.S. PATENT DOCUMENTS

| | | | | |
|---|---|---|---|---|
| 3,960,310 A | * | 6/1976 | Nussbaum | B23D 65/00 228/6.1 |
| 4,061,057 A | * | 12/1977 | Gray | B23D 65/00 76/112 |
| 4,188,524 A | * | 2/1980 | Trinchera | B23D 65/00 219/77 |
| 5,299,472 A | * | 4/1994 | Ellis | B23D 65/00 228/5.1 |
| 2016/0024607 A1 | * | 1/2016 | Work | C21D 8/005 148/510 |

* cited by examiner

CARBIDE SAW BLADE AND WELDING METHOD THEREOF

PRIORITY CLAIM

The present application claims the priority of China Application No. 201711141942.1, filed Nov. 17, 2017, the disclosure of which is incorporated herein by reference in its entirety.

TECHNICAL FIELD

This invention is related to the welding field, especially related to the carbide saw blade and welding method thereof.

BACKGROUND

The carbide circular saw blades are widely used in the furniture manufacturing, engineering and construction, and home decoration field.

The prior art is performed by manual welding or automatic equipment welding, during the welding process, due to the difficulty in controlling temperature and time, tempering could not completely eliminate the stress of the base tooth holder and reduce the hardness of the base tooth holder, resulting in: ① during the cutting process, since the impact to aluminum alloy saw blade is large, the safety issue of the tooth holder breaking is easy to occur; ② for the saw blade with pitch 12 mm, there is a critical interlaced state in the welding thermal influence area between two adjacent sawteeth during welding, so the safety issue of tensile stress cracking is easy to occur.

SUMMARY

The object of the invention is to provide the carbide saw blade and welding method thereof, one aspect of the present invention solves the problems cutting off the tooth holder caused by inconsistence hardness or high hardness of saw blade tooth holder. The other aspect of the invention solves the problem of stress cracking between adjacent sawteeth, and reduces the product scrapped and lower the product safety issues. The centralized processing in a closed vessel could make reliable product performance.

In order to solve the above problems, one aspect of the present invention provides a method of welding carbide saw blade, comprising:

S1, heating the carbide tool bit, the welding wire, the welding flux and the saw blade base well-placed.

S2, at temperature 760° C.-840° C., spreading the melted welding wire to the gap between the carbide tool bit and the saw blade base by using the wetting action of the welding flux;

S3, cooling to obtain a preliminary welding body, when the temperature of the preliminary welding body is lower than 350° C., the preliminary welding body will be processed to first tempering;

S4, within 1-3 hours after first tempering, second tempering the preliminary welding body to obtain carbide saw blade;

wherein second tempering process is performed in a sealed container, and in this container the temperature of each spatial location is consistent.

Further, the welding flux is one or more of h285, UN285, or flux 102.

Further, first tempering temperature is between 400° C. to 500° C., and first tempering time is 0.5~2 second.

Further, second tempering temperature is between 380° C. to 480° C., and second tempering time is 3~5 hours.

Further, to heating, first temper and/or second temper the carbide tool bit, the welding wire, the welding flux and the saw blade base by using an induction coil.

The other aspect of the invention provides a carbide saw blade produced by the above method of welding the carbide saw blade, the carbide saw blade comprising a saw blade base and a carbide tool bit welded on the saw blade base.

By second tempering process, the present invention on one side solves the problem of cutting off the tooth holder caused by inconsistence hardness or high hardness of saw blade tooth holder, on the other side solves the problem of stress cracking between adjacent saw teeth.

THE BRIEF DESCRIPTIONS OF THE DRAWINGS

DETAILED DESCRIPTION

To make the objective, technical solutions, and advantages of the present invention more clear, we will describe the present invention in further detail with reference to the specific embodiment and the accompanying drawings. It should be understood that these descriptions are only exemplary, and are not intended to limit the scope of the invention. Furthermore, in the following description, the descriptions of well-known structures and techniques are omitted, in order to avoid unnecessarily obscuring the concepts of the present invention.

Figure 1:
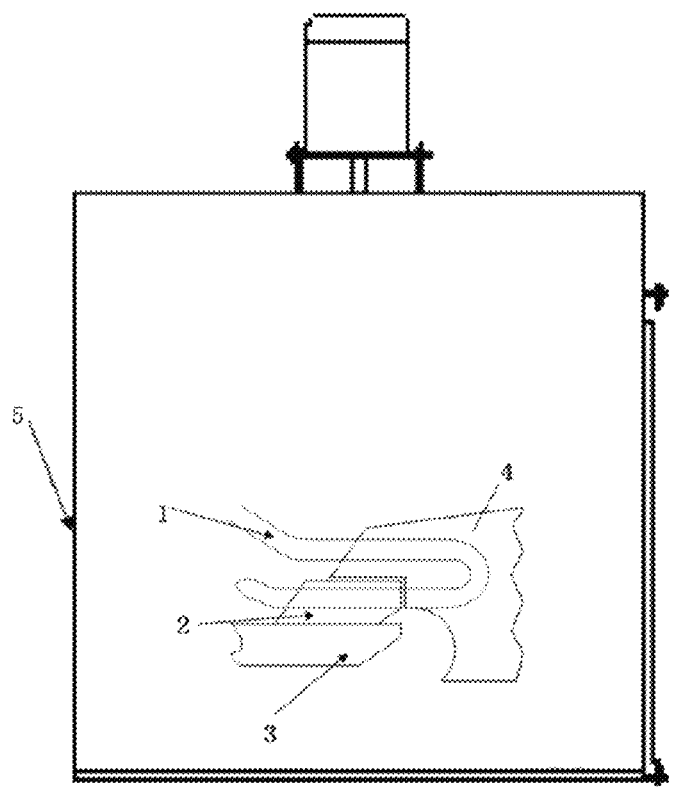
FIG. 1 is the welding principle diagram of the carbide saw blade according to the present invention.

FIG. 1 is the welding principle diagram of the method of welding the carbide saw blade according to the present invention.

As shown in the FIG. 1, the first embodiment of the present invention provides a method of welding the carbide saw blade, includes:

S1, heating the carbide tool bit 2, the welding wire 1, the welding flux and the saw blade base (the saw blade base's tooth seat part) that well-placed, heating time is 4-10 second, and heating temperature is 760° C.-840° C., the carbide tool bit 2 is supported by the supporting block 3;

S2, at temperature 760° C.-840° C., spreading the melted welding wire to the gap between the carbide tool bit 2 and the tooth seat part of the saw blade base 4 by using the wetting action of the welding flux, to weld the carbide tool bit 2 to the saw blade base 4;

S3, cooling to obtain a preliminary welding body, when the temperature of the preliminary welding body is lower than 350° C., the preliminary welding body will be processed to first tempering; preferably, first tempering temperature is 400° C.-500° C., first tempering time is 0.5~2 seconds.

S4, within 1-3 hours after first tempering, second tempering the preliminary welding body to obtain carbide saw blade. Preferably, second tempering temperature is: 380° C.-480° C., second tempering time is 3 to 5 hours. Wherein, second tempering has to be done in a sealed container 5 and the temperature of the container should be the same in various spatial location of the container.

Alternatively, the welding flux is one of more of h285, UN285 or flux 102.

Another embodiment of the present invention provides a carbide saw blade produced by the above method of welding the carbide saw blade, the carbide saw blade includes the saw blade base and the carbide tool bit welded on the saw blade base.

Specifically, the carbide circular saw blades through the vortex heat produced by an induction coil (shown in FIG. 7), heat the carbide tool bit, the welding wire, the welding flux, the saw blades base placed in the magnetic field to 760° C.~840° C., then melted welding wire (wire m. p. 690° C.~760° C.), under the wetting action of welding flux, spreads to the gap between the carbide tool bit and the saw blade base, after the welding wire covers the whole, the induction coil stops heating to let them cool naturally, until the temperature is below about 350° C., the induction coil is reheated to perform first medium temperature tempering (400° C.~500° C.) on the welded part, to obtain the preliminary welding body, then let the preliminary welding body cool naturally to complete carbide saw blade welding, within 1—3 hours after first tempering, second tempering is performed on the preliminary welding body to obtain the carbide saw blade.

Here, within 1-3 hours after first tempering treatment, the preliminary welding body after the initial first tempering treatment can be collected and hung on the hanging rod of the trailer and sent to the sealed box furnace, then the temperature is raised to 380° C.~480° C. for incubation 3-5 hours, after the incubation is completed, take out and naturally cool in the air. The box furnace must be sealed and well insulated, at the same time, the heat pipe needs to be installed on the three inner walls of the box furnace and a stirring fan is installed on the box to ensure uniform temperature in each spatial location in the furnace, this is the key to realization of the present invention.

Optionally, using the induction coil, the carbide tool bit, the welding wire, the welding flux and the saw blade base, are heated, first tempered and/or second tempered.

Figure 2:
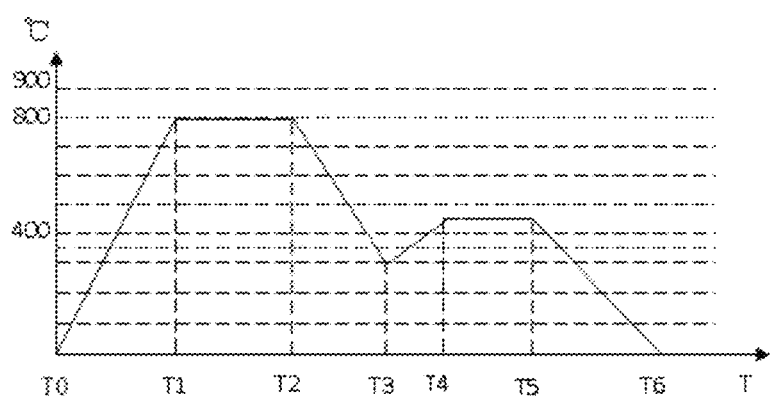
FIG. 2 is the welding temperature curve of the welding process of the carbide saw blade in the prior art.

FIG. 2 shows a welding temperature curve of the welding process of the carbide saw blade in the prior art.

As shown in FIG. 2, T0-T1 is first heating stage. T1-T2 is the process in which the carbide tool bit 2 is welded to the saw blade base 4, T2-T3 is first cooling stage, and the carbide tool bit is welded to the saw blade base after cooling. T3-T4 is second heating stage. T4-T5 is first tempering stage. T5-T6 is second cooling stage.

The prior art is performed by manual welding or automatic equipment welding, during the welding process, due to the difficulty in controlling temperature and time, tempering could not completely eliminate the stress of the base tooth holder and reduce the hardness of the base tooth holder, resulting in: ① during the cutting process, since the impact to aluminum alloy saw blade is large, the safety issue of the tooth holder breaking is easy to occur; ② for the saw blade with pitch 12 mm, there is a critical interlaced state in the welding thermal influence area between two adjacent sawteeth during welding, so the safety issue of tensile stress cracking is easy to occur.

Figure 5:
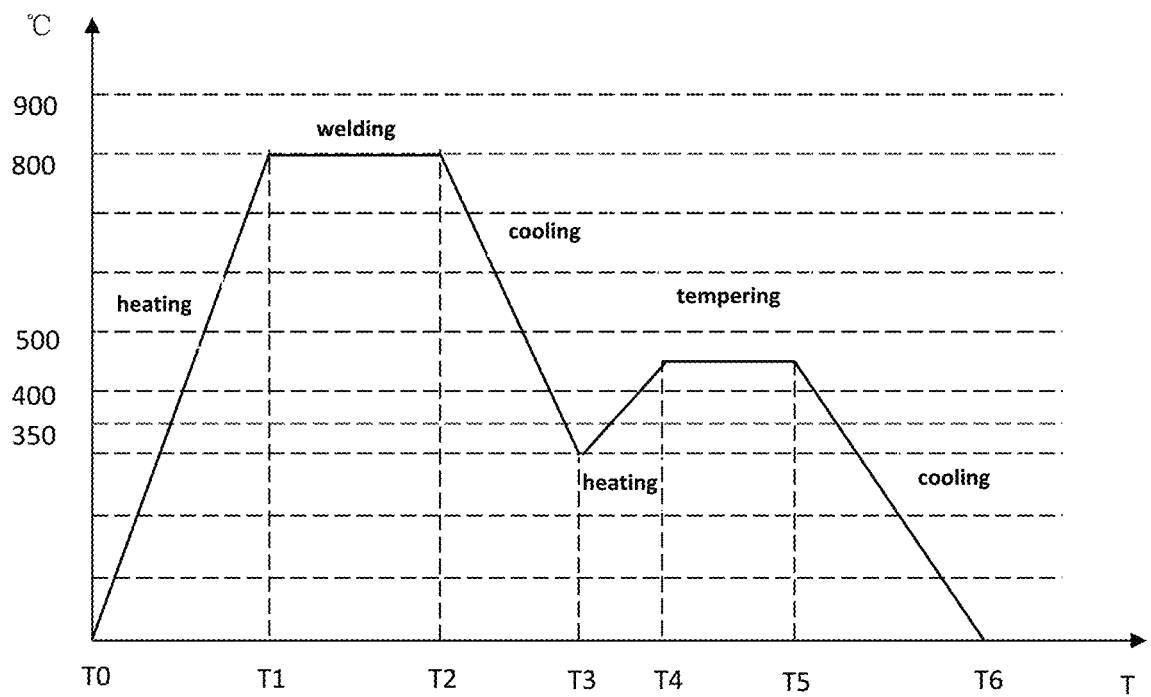
FIG. 5 is the welding temperature curve of the welding process of the carbide saw blade in the present invention showing the welding and the first tempering process.

FIG. 5 shows a welding temperature curve of the welding process of the carbide saw blade of the present invention.

As shown in FIG. 5, T0-T1 is a first heating stage. T1-T2 is the process in which the carbide tool bit 2 is welded to the saw blade base 4, T2-T3 is first cooling stage, and the carbide tool bit is welded to the saw blade base after cooling. T3-T4 is second heating stage. T4-T5 is first tempering stage. T5-T6 is second cooling stage.

Figure 6:
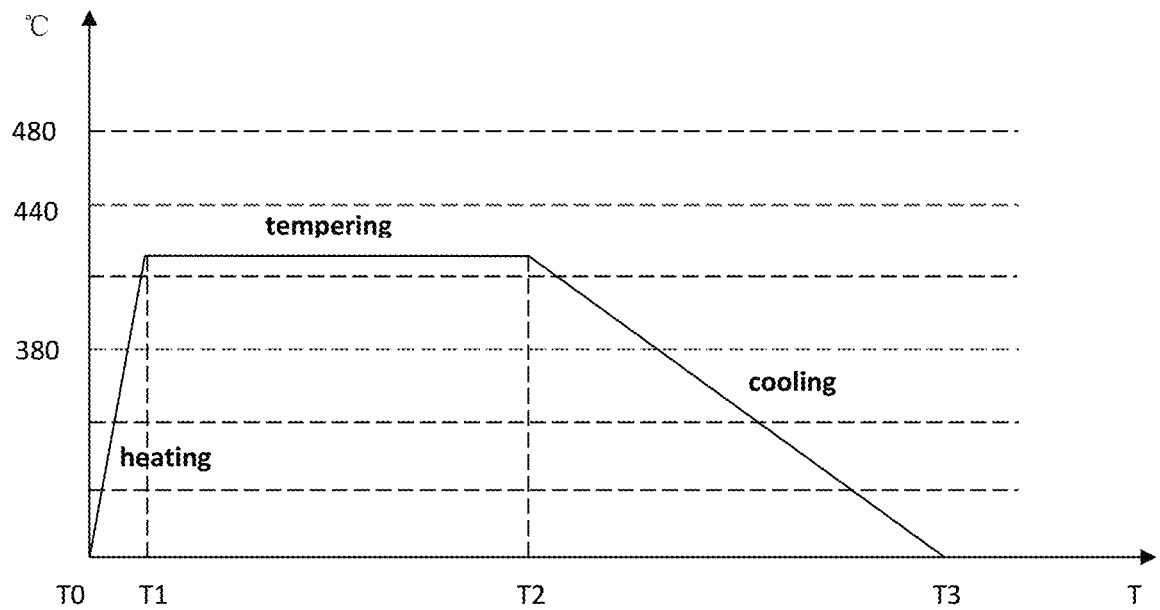
FIG. 6 is the welding temperature curve of the welding process of the carbide saw blade in the present invention showing the second tempering process.

FIG. 6 is the welding temperature curve of the welding process of the carbide saw blade in the present invention showing the second tempering process.

As shown in FIG. 6, T0-T1 is a third heating stage. T1-T2 is a second tempering stage. T2-T3 is a third cooling stage.

Figure 7:
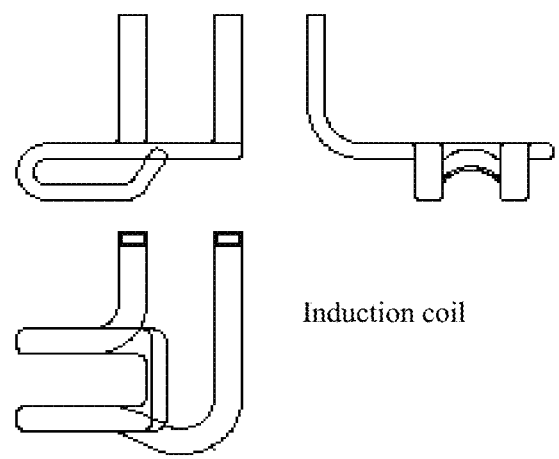
FIG. 7 is an elevation view of an induction coil according to present invention.

FIG. 7 is an elevation view of an induction coil according to present invention.

The induction coil is used to heat, first temper, and/or second temper the carbide tool bit, the welding wire, the welding flux and the saw blade base.

1. Analysis of the Problem of Easy Breaking of the Tooth Holder

Figure 3:
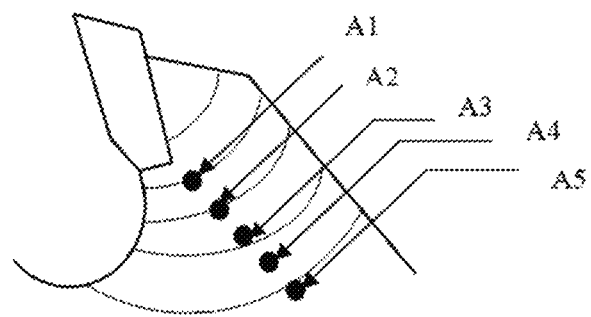
FIG. 3 is the partial structure schematic diagram of any one of the sawtooth of the carbide saw blade.

FIG. 3 is a partial structure schematic diagram of any one of the sawtooth of the carbide saw blade. As shown in FIG. 3, the arc area is a thermal influence area, and A1-A5 represents the test point. After the sawtooth is welded, as shown in FIG. 3, four different alloy sawtooths on the same carbide saw blade are randomly selected to polish and detect the hardness values of the sawtooth of the five test points A1-A5 in FIG. 2. Hardness values of the sawtooth of A1-A5 are shown in Table 1 below:

TABLE 1

| | Hardness value of the test point A1-A5 (HRC) | | | | |
|---|---|---|---|---|---|
| Number | A1 | A2 | A3 | A4 | A5 |
| sawtooth 1 | 52 | 52 | 39 | 33 | 32 |
| sawtooth 2 | 48 | 46 | 36 | 35 | 31 |
| sawtooth 3 | 50 | 47 | 38 | 34 | 32 |
| sawtooth 4 | 49 | 48 | 35 | 39 | 34 |

According to the test data of Table 1, the hardness value of the sawtooth, after welding, machine tempering and artificial tempering, is not stable, and the sawtooth 1—sawtooth 4 with a higher hardness have safety problems of tooth holder breaking influenced by the impact force during cutting.

By second tempering process after welding (tempering temperature at 380° C., 440° C., 480° C.), as shown in FIG. 3, under every tempering temperature condition, four different alloy sawtooths on the same carbide saw blade are randomly selected to polish and detect the hardness values of the sawtooth of the five test points A1-A5, its hardness value is shown in Table 2, Table 3, Table 4 below:

TABLE 2

| | (Tempering at 380° C.) | | | | |
|---|---|---|---|---|---|
| | Hardness value of the test point A1-A5 (HRC) | | | | |
| Number | A1 | A2 | A3 | A4 | A5 |
| sawtooth 1 | 46 | 46 | 43 | 39 | 35 |
| sawtooth 2 | 45 | 43 | 42 | 36 | 34 |

TABLE 2-continued (Tempering at 380° C.)

| Number | Hardness value of the test point A1-A5 (HRC) | | | | |
|---|---|---|---|---|---|
| | A1 | A2 | A3 | A4 | A5 |
| sawtooth 3 | 42 | 42 | 43 | 38 | 34 |
| sawtooth 4 | 46 | 45 | 43 | 39 | 36 |

TABLE 3

(Tempering at 440° C.)

| Number | Hardness value of the test point A1-A5 (HRC) | | | | |
|---|---|---|---|---|---|
| | A1 | A2 | A3 | A4 | A5 |
| sawtooth 1 | 42 | 42 | 41 | 38 | 38 |
| sawtooth 2 | 43 | 41 | 41 | 39 | 37 |
| sawtooth 3 | 42 | 42 | 42 | 39 | 36 |
| sawtooth 4 | 44 | 43 | 43 | 41 | 39 |

TABLE 4

(Tempering at 480° C.)

| Number | Hardness value of the test point A1-A5 (HRC) | | | | |
|---|---|---|---|---|---|
| | A1 | A2 | A3 | A4 | A5 |
| sawtooth 1 | 38 | 38 | 37 | 37 | 36 |
| sawtooth 2 | 39 | 38 | 38 | 38 | 37 |
| sawtooth 3 | 38 | 37 | 37 | 36 | 36 |
| sawtooth 4 | 37 | 37 | 36 | 36 | 35 |

It can be seen from the test data of Table 2, Table 3 and Table 4 that after second tempering treatment, the hardness of the tooth holder is relatively stable, and the hardness of the tooth holder is lowered, the toughness of the tooth holder is increased, thereby improving the risk of cutting the broken teeth.

2. Analysis of the Problem of Tensile Stress Cracking Between Adjacent Saw Teeth.

Figure 4:
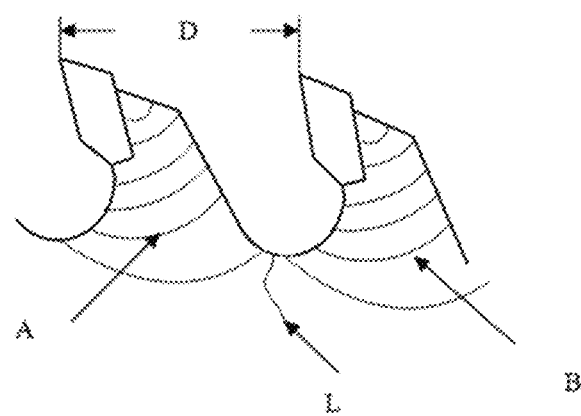
FIG. 4 is the partial structure schematic diagram of any two adjacent sawteeth of the carbide saw blade.

FIG. 4 is the partial structure schematic diagram of any two adjacent sawteeth of the carbide saw blade. As shown in FIG. 4, when a saw blade with a tooth pitch D≤12 mm (tooth pitch=blade circumference÷saw blade teeth number), since the tooth pitch is too small, during welding there is a critical interlaced state between the thermal influence area A and the thermal influence area B, and since the stress is not completely eliminated by tempering, there will be safety problems of cracking L of tensile stress between the adjacent saw teeth, after welding due to the stress shrinkage interaction between the adjacent sawteeth, as shown in FIG. 4. The cracking data of tensile stress between adjacent saw teeth of products above 12 inches in the first half of 2014 are shown in Table 5 below:

TABLE 5

| Lot Number | Serial number | Production quantity | Scrapped quantity | Scrap rate |
|---|---|---|---|---|
| 14031209 | A33503223E1200T | 396 | 282 | 71.21% |
| 140324111 | W33003223E0960T | 580 | 112 | 19.31% |
| 140324114 | A33503223E1200T | 400 | 258 | 64.50% |

TABLE 5-continued

| Lot Number | Serial number | Production quantity | Scrapped quantity | Scrap rate |
|---|---|---|---|---|
| 140430101 | W33003223E0960T | 495 | 64 | 12.93% |
| 140505205 | W33003223E0800A | 496 | 85 | 17.14% |
| 140505206 | A33003223E1200T | 599 | 58 | 9.68% |

The cracking data of tensile stress between adjacent saw teeth of products above 12 inches processed by second tempering process after are shown in Table 6 below:

TABLE 6

| Lot number | Serial number | Production Quantity | Scrapped Quantity | Scrap rate |
|---|---|---|---|---|
| 140721102 | W33003223E0960T | 493 | 0 | 0.00% |
| 140905102 | AD2552418D1000T | 2305 | 0 | 0.00% |
| 140929103 | WM2352618D1000A | 1932 | 0 | 0.00% |
| 140812111 | W43003223E0960T | 396 | 0 | 0.00% |
| 140721203 | W74003525E0800A | 100 | 0 | 0.00% |
| 140718101 | AD2552418D1200T | 1602 | 0 | 0.00% |
| 140711109 | W33503223E1000A | 296 | 0 | 0.00% |
| 140610112 | W43003223E0960A | 170 | 1 | 0.59% |
| 140812106 | A33003223E1200T | 494 | 0 | 0.00% |
| 140721201 | W33003223E0960A | 592 | 0 | 0.00% |
| 140913108 | A22552418D1200T | 1993 | 0 | 0.00% |
| 140912107 | WM2552316D1200T | 1950 | 0 | 0.00% |
| 140827103 | A33003223E1200T | 259 | 0 | 0.00% |
| Total | | 12582 | 1 | 0.01% |

It can be seen from the statistical data in Table 4 that the tensile stress cracking appearing between adjacent saw teeth after second tempering treatment has been completely solved, which reduces the safety risk of the product use, and increases the economic benefit.

The present invention aims to protect the carbide saw blade and welding method thereof, on the one hand, the present invention solves the problem that the sawtooth tooth holder has uneven hardness and high hardness, resulting in cutting the broken tooth holder. On the other hand, the problem of tensile stress cracking between adjacent saw teeth is solved, which reduces the scrapping of products and reduces the safety problem of product use. In addition, centralized processing in a sealed container makes the product performance more reliable.

It should be understood that the above detailed embodiments of the present invention are only used to exemplify or explain the principles of the invention and are not intended to limit the invention. Therefore, any modifications, equivalent substitutions, improvements and the like made without departing from the spirit and the scope of the invention, all should be included in the scope of the protection of the present invention. In addition, the attached claims are intended to cover all that fall within the range and the scope of the claims, or all variations and modifications within the equivalents of such scope and boundaries.

What is claimed is:

1. A method of welding a carbide saw blade, comprising:
   heating a carbide tool bit, a welding wire, a welding flux and a saw blade base, wherein the carbide tool bit and the saw blade base are placed in a predetermined location;
   when a temperature of the carbide tool bit, the welding wire, the welding flux and a tooth seat part of the saw blade base reaches 760° C.-840° C., spreading the melted welding wire to a gap between the carbide tool bit and the tooth seat part of the saw blade base by using a wetting action of the welding flux;

cooling to obtain a preliminary welding body having the carbide tool bit welded on the saw blade base, when a temperature of the preliminary welding body is lower than 350° C., the preliminary welding body will be processed to a first tempering; and within 1-3 hours after the first tempering, initiating a second tempering process to temper the preliminary welding body to obtain the carbide saw blade;

wherein the second tempering is performed in a sealed container, wherein the sealed container has a uniform temperature in all spatial location in the sealed container, and wherein the first tempering is processed by heating the preliminary welding body at a first tempering temperature between 400° C. to 500° C. for 0.5~2 second.

2. The method of welding the carbide saw blade according to claim 1, wherein the welding flux is one or more of h285, UN285, or flux 102.

3. The method of welding the carbide saw blade according to claim 2, wherein using an induction coil to heat, first temper and/or second temper the carbide tool bit, the welding wire, the welding flux and the saw blade base.

4. The method of welding the carbide saw blade according to claim 1, wherein second tempering temperature is between 380° C. to 480° C., and second tempering time is 3~5 hours.

5. The method of welding the carbide saw blade according to claim 4, wherein using an induction coil to heat, first temper and/or second temper the carbide tool bit, the welding wire, the welding flux and the saw blade base.

6. The method of welding the carbide saw blade according to claim 1, wherein using an induction coil to heat, first temper and/or second temper the carbide tool bit, the welding wire, the welding flux and the saw blade base.

7. The method of welding the carbide saw blade according to claim 1, wherein using an induction coil to heat, first temper and/or second temper the carbide tool bit, the welding wire, the welding flux and the saw blade base.

8. The method of welding the carbide saw blade according to claim 1, wherein the predetermined location is a magnetic field.

* * * * *